Jan. 2, 1951  D. G. SMELLIE  2,536,776
ELECTRIC TOASTER
Filed May 12, 1948

INVENTOR.
Donald G. Smellie
BY
Harry S. Demarse
ATTORNEY.

Patented Jan. 2, 1951

2,536,776

UNITED STATES PATENT OFFICE 2,536,776

ELECTRIC TOASTER

Donald G. Smellie, Canton, Ohio, assignor to The Hoover Company, North Canton, Ohio, a corporation of Ohio Application May 12, 1948, Serial No. 26,638

7 Claims. (Cl. 99—385)

This invention relates to an electric appliance, and more particularly to an electric toaster having means associated with the base thereof for securing the electric appliance or power cord in storage position about the electric appliance or toaster when it is not in use.

Conventional electric toasters now have no provision for the storage of the electric cord. Usually, the owners of these toasters wrap the cord about the toaster where, although it will be out of the way, it easily drops off the toaster, becomes unwound and may become tangled with other articles upon the place of storage for the toaster when it is put away.

Therefore, it is an object of the present invention to provide an electric appliance, and more particularly an electric toaster with electric cord storage means associated particularly with the base of the toaster and mounted within the confines of the outer periphery thereof to store and hold the cord in place after it has been wound about the cord storage construction of the toaster while at the same time permitting the cord to be easily detached and unwound when the toaster is to be used.

Another object of the invention is to provide an improved electric toaster cord storage means comprising an outwardly opening, peripheral channel in the toaster supporting base which lies within the maximum horizontal dimensions of the toaster structure.

A further object of the invention is to provide an electric toaster having a cord storage construction incorporating securing means for the terminal plug.

A further object of the invention is to provide a toaster of the foregoing character with a cord terminal plug embodying means for engaging the cord storage receiving channel to retain the plug in fixed storage position.

Still another object of the invention is to provide a cord storage device for an electrical appliance which is simple in construction, inexpensive to manufacture and one which will be very efficient in operation and application to the use to which it is placed.

These and other more specific objects will appear upon reading the following specification and claims and upon considering in connection therewith the attached drawings to which they relate.

Referring now to the drawings in which preferred embodiments of the present invention are disclosed, and in which the same reference character refers to the same parts throughout:

Figure 1:
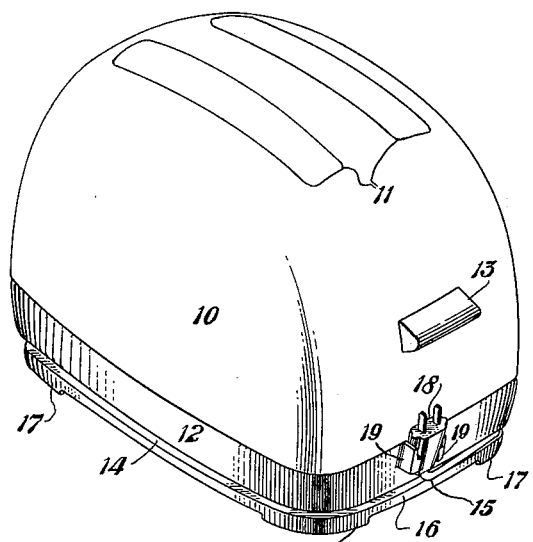
Figure 1 is a perspective view of an electrical appliance, particularly in the form of an electric toaster, provided with the improved cord storage construction of this invention.

Referring to the drawings, the electric toaster, or electrical appliance, to which the novel cord storage means of this invention is applied is indicated in general by the reference character 10 applied to the shell of the toaster and is of a conventional construction wherein the bread to be toasted is inserted into the toaster chamber through slots 11 at the top of the shell of the toaster and may be ejected or removed through the slots when toasted. A toaster base construction 12 is provided for supporting the toaster in an elevated position to provide a cool supporting surface for the toaster. It will be understood that the usual conventional toasting mechanism will be provided within the toaster. The toasting mechanism has not been illustrated in the various modifications of the invention as it is unnecessary for the disclosure of the invention since it is the toaster base construction which carries the improved cord storage means and the modifications thereof of this invention. The toaster may have the conventional carrying handles 13, one of which actuates the toaster carriage and sets the toaster mechanism, as is well understood in the art.

Figure 2:
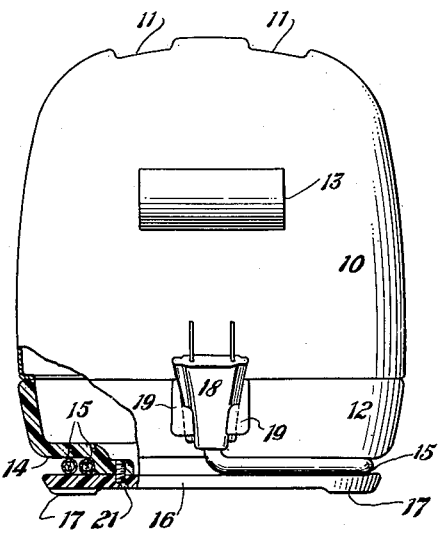
Figure 2 is a side view showing the lower portion of the electric toaster in elevation, with the cord storage means partially in section.
Figure 3:
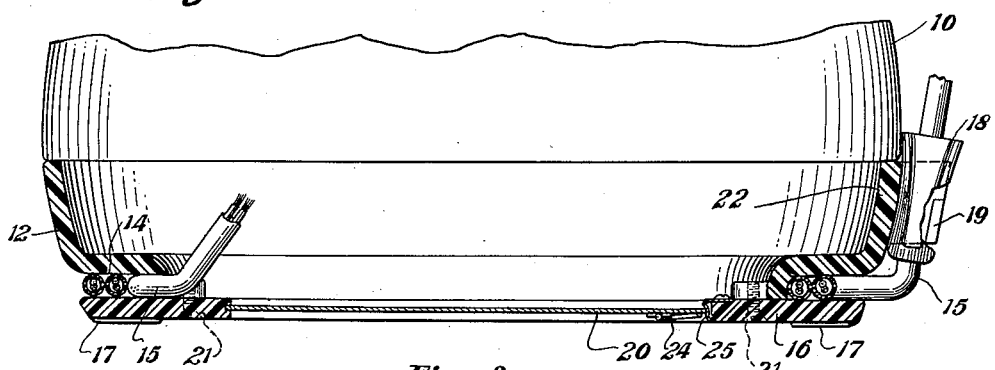
Figure 3 is a view in elevation, partly in section, showing the cord storage means taken substantially through the center-line of the toaster.

The novel cord storage construction of this invention comprises a horizontal groove or channel 14 formed on the toaster base 12 which is attached by any suitable means to the shell 10 of the toaster. The base member 12 is undercut horizontally about the entire periphery of the base so that when the appliance cord 15 of conventional length is wound within the slot 14 there will be approximately three turns of the appliance cord within the groove. The cord storage groove 14 may be formed by the use of a separate member 16 as shown in the embodiment of Figures 1 to 3, molded or formed integrally by the member 16', as illustrated in the embodiment illustrated in Figures 4 and 5. The members 16 and 16' may be formed with suitable foot pads 17 to elevate the toaster base slightly above the supporting surface upon which it is positioned to provide a passage for cooling air underneath the base of the toaster.

The appliance cord 15, as illustrated in Figure 3, is connected at one end through a suitable strain relief (not shown) to the electric heater elements and the like as is well understood in the art, whereas the end of the appliance cord which is adapted to be connected to an appliance outlet is provided with a conventional bell-shaped plug 18, as shown, or a plug of any other suitable design. One end wall of the cord storage construction as provided on the base of the toaster may be provided with suitable projections 19, complementally formed with respect to the shape of the plug 18, Figures 2 and 3; and, it is within the scope of the invention that these may be either integrally molded with the base construction 12 or separately attached to provide a cord plug receptacle to anchor the end of the cord 15. It is preferred to mount the plug receptacle formed by the projections 19 vertically although it may be formed at any suitable angle on the cord storage base construction which will still retain the plug in the receptacle and lock the cord within the cord storage groove.

In either of the embodiments of the invention, it is preferred to provide a crumb tray 20 detachably mounted within the member 16 and in the modification 16' thereof. In the preferred embodiment of Figures 1 to 3, the member 16 is detachably mounted by securing means 21 as illustrated in Figures 2 and 3 securing the member 16 to the upper part 22 of the cord storage construction which is formed as illustrated in Figures 2 and 3 to provide the cord storage groove 14. The cord storage base is either formed as a separate member, as illustrated in Figures 2 and 3, or integrally molded as shown in Figure 4, and it is preferably molded from a suitable plastic material having satisfactory physical characteristics to withstand the toasting temperatures of the toaster and adapted to prevent the transmission of heat after the toasting operation is finished and prior to the cooling down of the toaster when the cord is stored thereon after the toasting operation and prior to when the toaster is stored away after use.

Figure 4:
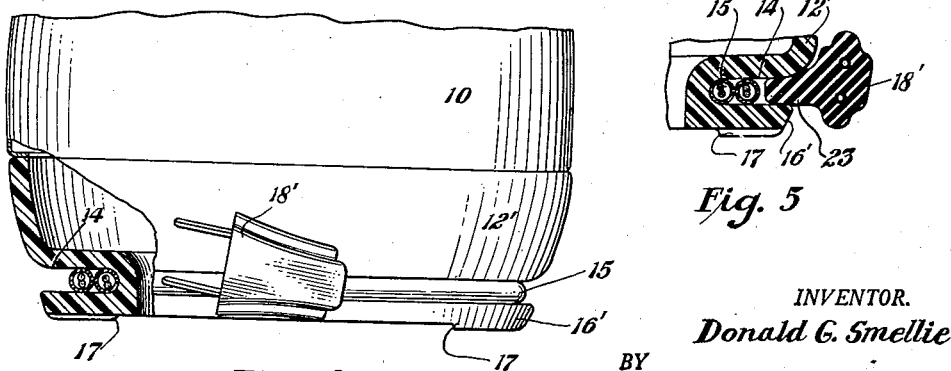
Figure 4 is a view showing the lower portion of the electric toaster in side elevation of another embodiment of the cord storage means partly in section; and, Figure 5 is a sectional view taken through the electric cord plug of the embodiment of Figure 4, illustrating a cord plug securing means in combination with the cord storage construction of this invention.
Figure 5:
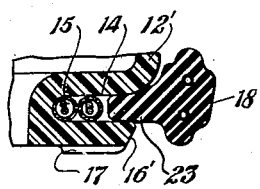

In the embodiment of the invention illustrated in Figures 4 and 5 a tongue 23 is molded integrally on the terminal plug 18'. The groove 14 is sufficiently deep to accommodate the tongue 23 when the cord 15 is wound therein. The tongue 23 is dimensioned to wedge into the groove 14 and secure the plug 18' against the side of the base structure 12'. The plug 18' may be molded of any suitable material such as hard or soft rubber or plastic. This construction permits the plug 18' to be anchored at any point around the periphery of the toaster and the cord may be lengthened or shortened without interfering with the plug anchoring construction.

In use, the terminal plug 18 in the modification of Figures 1 to 3 and the plug 18' in the modification of Figures 4 and 5, may be detached from the receptacle formed by the members 19, as illustrated in Figure 2, or from the groove 14 after which the appliance cord is unwound from the horizontally displaced cord storage slot 14 either the entire amount or a sufficient amount in order to plug the toaster into the conventional electrical outlet connection. When the toaster is not in use, the cord is wrapped within the horizontally disposed cord storage groove 14 in a plurality of coils disposed one about the other from the bottom of the groove 14 outwardly after which the terminal plug is placed in the modification of Figures 1 to 3 within the receptacle formed by the projections 19, and in the modification of Figures 4 and 5, by wedging the tongue 23 within the groove 14. In either embodiment of the invention, the plug is prevented from being accidentally detached by the constructions as described above. The appliance cord 15 is entirely concealed from view substantially within the confines of the periphery of the base 12 of the toaster forming the cord storage construction and also within the confines of the periphery of the shell 10 of the toaster. The groove 14 is so shaped as to prevent the insulation from becoming worn or frayed, and the plastic construction of the base 12 not only provides heat insulation for the appliance cord but also electrical insulation therefor.

The cord storage construction is also formed as described above to provide a mounting for the crumb tray 20 within the member 16 of the cord storage construction. The crumb tray 20 may be readily removed and replaced with the cord either in its storage position or unwound from the cord storage construction by tilting the toaster upwardly at one end and pulling outwardly on a detaching ring or handle 24 unlatching the crumb tray from a latch construction 25, as shown in Figure 3. After the crumbs have been shaken from the toaster and the crumb tray emptied, the crumb tray is replaced in the reverse order.

From the foregoing description of the construction of the novel cord storage device of each of the embodiments of the invention, the operation thereof and the method of applying the same to use will be readily understood. It is to be understood that there has been provided a simple, inexpensive and efficient cord storage means for carrying out the objects of the invention. Although only two embodiments of the cord storage means of this invention best adapted to perform the functions set forth have been disclosed, it is evident that various changes in form, proportion and in the minor details of construction may be taken without departing from the spirit of the invention.

Various changes may be made in the construction, arrangement and proportion of the parts illustrated in the accompanying drawing without departing from the spirit of the invention within the scope of the appended claims.

What is claimed is:

1. The combination with an electrical appliance including means adapted to be energized and de-energized and an electrical appliance cord operatively attached to the aforesaid means, of a base construction for supporting said electrical appliance formed with an outwardly opening cord receiving peripheral groove lying within the peripheral boundaries of said appliance and adapted to receive said appliance cord therein within the confines of the peripheral boundaries of said appliance.

2. An electric toaster including a casing shell and a supporting base, a power cord attached to said toaster, said base being formed with a horizontally opening peripheral slot in which said cord is adapted to be wound for storage.

3. An electric toaster including a casing shell and a supporting base, a power cord having a terminal plug attached to said toaster, said base being formed with a horizontally opening peripheral slot in which said cord is adapted to be wound for storage, means on said base forming a socket adapted to receive said terminal plug and detachably secure said cord and plug in storage position.

4. An electric toaster including a casing shell and a supporting base, a power cord having a terminal plug attached to said toaster, said base being formed with a horizontally opening peripheral slot in which said cord is adapted to be wound for storage, and a projecting tongue on said terminal plug adapted to wedge into said slot to retain said cord and plug in storage position.

5. An electric toaster including a casing structure defining an oven housing electric heating means and having a base structure of heat insulating material, a power cord for supplying electrical energy to said heating means, said base structure being formed with a horizontally opening cord storing peripheral groove lying below said oven.

6. An electrical appliance including a frame part having an annular outwardly opening cord storage groove therein, a power cord assembly including a terminal plug, said power cord being secured to said appliance and adapted to be wound in said groove for storage, and a projecting tongue on said terminal plug adapted to be wedged into said groove to secure said cord and terminal plug in storage position.

7. An electric toaster including a casing shell and a supporting base, a power cord having a terminal plug attached to said toaster, said base being formed with a horizontally opening peripheral slot in which said cord is adapted to be wound for storage and means for attaching said terminal plug to said base to retain said terminal plug and said cord in storage position.

DONALD G. SMELLIE.

REFERENCES CITED

The following references are of record in the file of this patent:

UNITED STATES PATENTS

| Number | Name | Date |
|---|---|---|
| 2,143,529 | White | Jan. 10, 1939 |
| 2,229,945 | Uhlrig | Jan. 28, 1941 |
| 2,244,619 | Heise et al. | June 3, 1941 |